United States Patent
Xue et al.

(10) Patent No.: US 9,239,111 B2
(45) Date of Patent: Jan. 19, 2016

(54) CYLINDER LINER WITH HIGH STRENGTH AND WEAR RESISTANCE AND MANUFACTURING METHOD THEREOF

(71) Applicant: Henan Province Zynp Corporation, Mengzhou, Henan (CN)

(72) Inventors: Delong Xue, Mengzhou (CN); Xiaocai Qin, Mengzhou (CN); Zhijun Liu, Mengzhou (CN); Wuhui Zou, Mengzhou (CN)

(73) Assignee: Henan Province Zynp Corporation, Mengzhou, Henan (CN)

( * ) Notice: Subject to any disclaimer, the term of this patent is extended or adjusted under 35 U.S.C. 154(b) by 400 days.

(21) Appl. No.: 13/968,827

(22) Filed: Aug. 16, 2013

(65) Prior Publication Data

US 2013/0333555 A1  Dec. 19, 2013

Related U.S. Application Data

(63) Continuation-in-part of application No. PCT/CN2011/079267, filed on Sep. 2, 2011.

(51) Int. Cl.
*F16J 10/00* (2006.01)
*F01B 11/02* (2006.01)
*F16J 10/04* (2006.01)
*C22C 37/00* (2006.01)
(Continued)

(52) U.S. Cl.
CPC ............... *F16J 10/04* (2013.01); *C21D 6/008* (2013.01); *C22C 1/02* (2013.01); *C22C 37/00* (2013.01); *C22C 37/08* (2013.01); *C22C 37/10* (2013.01); *C21D 2211/001* (2013.01); *C21D 2211/005* (2013.01); *F02F 1/00* (2013.01); *Y10T 29/49272* (2015.01)

(58) Field of Classification Search
CPC ........... F16J 10/04; C22C 37/00; C22C 37/10
USPC ....................................................... 92/171.1
See application file for complete search history.

(56) References Cited

U.S. PATENT DOCUMENTS 6,245,718 B1 * 6/2001 Romanov ............. C10M 111/00
                                                           508/103

FOREIGN PATENT DOCUMENTS

CN   102042113 A   5/2011
JP      6428342 A   1/1989

OTHER PUBLICATIONS

Lei, "Iron Materials Used for Cylinder Liners", Automobile Technology & Material, 1995, No. 10, pp. 23-25.
(Continued)

*Primary Examiner* — Edward Look
*Assistant Examiner* — Daniel Collins
(74) *Attorney, Agent, or Firm* — MacMillan, Sobanski & Todd, LLC

(57) ABSTRACT

A cylinder liner with high strength and wear resistance and a manufacturing method thereof. The composition (% by mass) of the cylinder liner is as follows: C: 3.0-3.3%, Si: 2.0-2.3%, P: 0.3-0.6%, S: <0.1%, Mn: 0.3-0.6%, Mo: 0.1-0.3%, Nb: 0.08-0.15%, and the balance Fe. The structure of the cylinder liner is phosphorus-containing acicular ferrite and carbon-rich austenite, wherein the phosphide eutectic is no less than 3%. The cylinder liner has a hardness of HRC38-43, Rm>400 MPa, high strength and good wear resistance, solves the problem of pearlite cylinder liner with low wear resistance and cast bainite with bad corrosion resistance.

19 Claims, 2 Drawing Sheets

(51) Int. Cl.
*C22C 37/10* (2006.01)
*C22C 37/08* (2006.01)
*C21D 6/00* (2006.01)
*C22C 1/02* (2006.01)
*F02F 1/00* (2006.01)

(56) References Cited

OTHER PUBLICATIONS

Yin et al., "Study on Properties of Cylinder and Its Isothermal Quenching Process by Residual Casting Heat", China Foundry, 2011, vol. 59, No. 10, pp. 1073-1075.

* cited by examiner

CYLINDER LINER WITH HIGH STRENGTH AND WEAR RESISTANCE AND MANUFACTURING METHOD THEREOF

CROSS-REFERENCE TO RELATED APPLICATIONS

This application is a continuation-in-part patent application of International Application No. PCT/CN2011/079267, filed Sep. 2, 2011. The disclosure of that application is incorporated herein by reference.

BACKGROUND OF THE INVENTION

The present invention belongs to the field of engine parts technology, especially relates to a cylinder liner with high strength and wear resistance and a manufacturing method thereof.

The cylinder liner is one of the key parts of the engine, whose material is mostly ordinary gray cast iron or alloy gray cast iron at present. Since such cylinder liner primarily relies on lowering carbon equivalent and alloy strengthening to meet the requirements of strength and wear resistance, its strength and wear resistance are relatively poor and its tensile strength is generally less than 350 Mpa. Thus it can not fulfill the requirements of energy conservation, cost reduction and emission reduction of the high-power engine plant. The cylinder liner cast iron products at home and abroad are almost now to be developed with low emission orientation, and the use of EGR (exhaust gas recirculation) has higher demand of wear resistance and decay resistance to the engine cylinder liner. Therefore, the development of cylinder liner with high strength and wear resistance is a problem proposed by the prior art development that calls for immediate solution.

SUMMARY OF THE INVENTION

It is an object of the present invention to provide a cylinder liner with high strength and wear resistance and a manufacturing method thereof, in order to meet the high requirements of strength and wear resistance of engine to the cylinder liner.

The technical solution adopted by the present invention is as follows.

A cylinder liner with high strength and wear resistance, the composition (% by mass) of which is as follows: C: 3.0-3.3%, Si: 2.0-2.3%, P: 0.3-0.6%, S: ≤0.1%, Mn: 0.3-0.6%, Mo: 0.1-0.3%, Nb: 0.08-0.15%, and the balance Fe; the structure of the cylinder liner is phosphorus-containing acicular ferrite and carbon-rich austenite, wherein phosphide eutectic is no less than 3%.

The carbon content of the austenite is 1.8-2.2%.

Specifically, the composition (% by mass) of the cylinder liner with high strength and wear resistance may take the following schemes:

1) C: 3.25, Si: 2.25, P: 0.35, S: 0.08, Mn: 0.5, Mo: 0.2, Nb: 0.082, and the balance Fe.
2) C: 3.2, Si: 2.15, P: 0.35, S: 0.07, Mn: 0.35, Mo: 0.26, Nb: 0.12, and the balance Fe.
3) C: 3.15, Si: 2.10, P: 0.35, S: 0.08, Mn: 0.50, Mo: 0.20, Nb: 0.082, and the balance Fe.
4) C: 3.00, Si: 2.00, P: 0.35, S: 0.07, Mn: 0.35, Mo: 0.26, Nb: 0.12, and the balance Fe.
5) C: 3.25, Si: 2.25, P: 0.35, S: 0.08, Mn: 0.50, Mo: 0.20, Nb: 0.14, and the balance Fe.
6) C: 3.20, Si: 2.15, P: 0.35, S: 0.07, Mn: 0.35, Mo: 0.26, Nb: 0.15, and the balance Fe.
7) C: 3.25, Si: 2.25, P: 0.55, S: 0.08, Mn: 0.50, Mo: 0.20, Nb: 0.082, and the balance Fe.

The trace phosphorus in the cylinder liner can promote graphitization, and the alloy elements in the cylinder liner can increase the hardenability while quenching and facilitate the formation of acicular ferrite.

The present invention further provides the manufacturing method of the said cylinder liner with high strength and wear resistance, the steps are as follows: performing proportioning according to the weight percentage ratio of C: 3.0-3.3%, Si: 2.0-2.3%, Mn: 0.3-0.6%, Mo: 0.1-0.3%, Nb: 0.08-0.15% and the balance Fe, manufacturing cylinder liner by centrifugal casting, austenitizing the cylinder liner in a neutral atmosphere, then isothermal quenching, and finally obtaining the said cylinder liner by low temperature tempering.

Q235 steel and pig iron with the mass ratio of 80:20 can also be used in proportioning.

The composition adjustment is performed to the composition by adding carburant when the carbon content is insufficient.

The composition (% by mass) of the said carburant is as follows: C: ≥99.00%, volatile: ≤0.6%, ash: ≤0.4%, dry basis moisture: ≤0.2%, S: ≤0.40%.

The casting temperature is 1320° C.-1400° C. and the rotational speed of centrifugal machine is 1350-1400 RPM when centrifugal casting the cylinder liner.

The pre-cooling time after centrifugal casting and before austenitizing is T=12+3*s, wherein the "s" is the cylinder liner unilateral wall thickness, and the unit of s is mm and the unit of T is s.

The condition of the austenitizing is that the temperature is 920±10° C. and the holding time is 90-100 minutes.

The isothermal quenching temperature is 330-350° C. and the isothermal quenching time is 75-85 minutes.

The quenching liquid is a mixture of potassium nitrate and sodium nitrate, wherein the mass ratio of potassium nitrate and sodium nitrate is 1:1.

The low temperature tempering temperature is 160-180° C., and the low temperature tempering time is 90-120 minutes.

The unmentioned parts in the method are conventional technology in the art.

The present invention provides a cylinder liner with phosphorus-containing acicular ferrite and carbon-rich austenite. There are phosphide eutectic and molybdenum carbide and niobium carbide in the structure of the cylinder liner. The strength of the phosphorus-containing acicular ferrite and carbon-rich austenite cast iron which has better wear resistance performance compared with ductile iron and gray cast iron is between ductile iron and gray cast iron. So, the use of phosphorus-containing acicular ferrite and carbon-rich austenite cast iron, especially when it is applied to the cylinder liner of EGR engine highlights its superiority of corrosion resistance and wear resistance. It is the first time to use the phosphorus-containing acicular ferrite and carbon-rich austenite cast iron in engine as a kind of material after the ductile iron and compacted graphite cast iron cylinder liners are found.

The structure of the cylinder liner is mainly obtained by the manufacturing method, wherein first the cylinder liner is prepared by centrifugal casting. In the condition of centrifugal casting, the phosphorus-containing cast iron whose matrix is pearlite which is not less than 95% can be stably produced in the present invention. The austenitizing is performed by heating in neutral atmosphere after pre-cooling, and then through isothermal quenching of phosphorus-containing cylinder liner to obtain the structure which is acicular ferrite and carbon-rich austenite, at the same time phosphide eutectic comes into being. This method makes the cylinder liner have characteristics of high strength, wear resistance and corrosion resistance.

The properties of the cylinder liner obtained from the present invention are as follows: hardness HRC38-43, Rm>400 Mpa and good corrosion resistance.

Compared with the existing cylinder liners, the present invention has the following advantages.

The cylinder liner with excellent properties in the present invention has the structure of phosphorus-containing acicular ferrite and carbon-rich austenite, which solves the problem of pearlite cylinder liner with low wear resistance and cast bainite with bad corrosion resistance. The manufacturing process of the cylinder liner is easy and stable.

Various aspects of this invention will become apparent to those skilled in the art from the following detailed description of the preferred embodiments when read in light of the accompanying drawings.

DETAILED DESCRIPTION OF THE PREFERRED EMBODIMENTS

The following embodiments are used to illustrate the technical solution of the present invention, but the scope of protection of the present invention is not limited thereto:

Example 1

The composition (% by mass) of the cylinder liner with high strength and wear resistance is:

C: 3.25, Si: 2.25, P: 0.35, S: 0.08, Mn: 0.5, Mo: 0.2, Nb: 0.082, and the balance Fe.

The manufacturing method is as follows.

Centrifugal casting: the casting temperature is 1380° C. and the rotational speed of centrifugal machine is 1360 RPM.

Machining: the cylinder liner is processed into a semi-finished product whose bore and cylindrical leave 0.5 mm margin; the unilateral wall thickness of the semi-finished product is 8 mm, and the pre-cooling time is 36 seconds.

Heat treatment: putting the cylinder liner semi-finished product into a controlled atmosphere furnace for austenitizing 1.5 h at 920° C., being quenched into the salt bath which has a composition of 50% sodium nitrite and 50% potassium nitrate, isothermal quenching 75 minutes at 340° C.; and low temperature tempering at 180° C. for 2 h.

Figure 1:
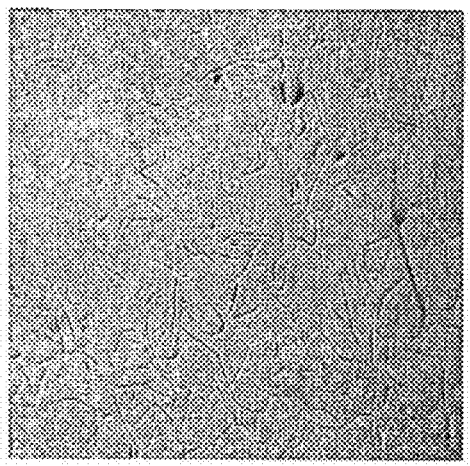
FIG. 1 is a view showing the structure of the cylinder liner manufactured by centrifugal casting after heat treatment of Example 1.
Figure 2:
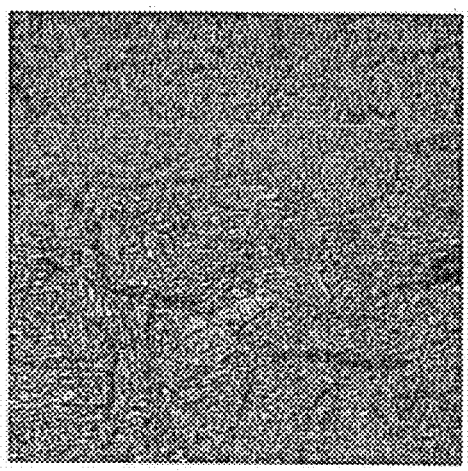
FIG. 2 is a photomicrograph (magnification: 500 times) of FIG. 1.
Figure 3:
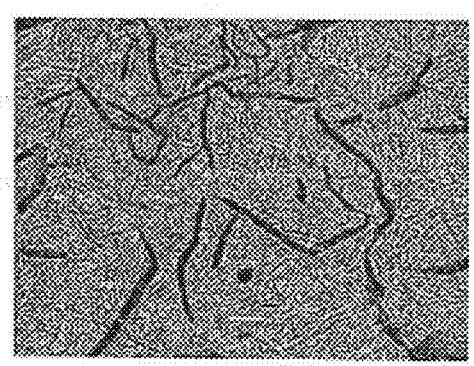
FIG. 3 is a SEM (scanning electron microscope) photograph (magnification: 1000 times) of FIG. 1.

As can be seen from FIGS. 1-3, the obtained structure of the cylinder liner is acicular ferrite and carbon-enriched austenite. Under the condition of a magnification of 100 times, the length of the graphite is 4-8 mm which meets the ATSMS class standard. The average hardness of the obtained cylinder liner is HRC41.1, Rm=432 Mpa.

Table 1 shows the dry friction test results of Example 1 cylinder liner, pearlite cylinder liner and cast bainite cylinder liner under different loads.

| load | volume wear rate of phosphorus-containing acicular ferrite cylinder liner ($\times 10^{-3} \cdot cm^3 \cdot cm^{-2}$) | volume wear rate of pearlite cylinder liner ($\times 10^{-3} \cdot cm^3 \cdot cm^{-2}$) | volume wear rate of cast bainite cylinder liner ($\times 10^{-3} \cdot cm^3 \cdot cm^{-2}$) |
|---|---|---|---|
| 100N | 9.95 | 11.6 | 10.41 |
| 200N | 11.48 | 44.13 | 14.95 |
| 300N | 12.24 | 133.14 | 27.41 |
| 400N | 12.78 | 176.14 | 54.94 |

Example 2

The composition (% by mass) of the cylinder liner with high strength and wear resistance is:

C: 3.2, Si: 2.15, P: 0.35, S: 0.07, Mn: 0.35, Mo: 0.26, Nb: 0.12, and the balance Fe.

The manufacturing method is as follows.

Centrifugal casting: the casting temperature is 1400° C. and the rotational speed of centrifugal machine is 1380 RPM.

Machining: the cylinder liner is processed into a semi-finished product whose bore and cylindrical leave 0.5 mm margin.

Heat treatment: putting the cylinder liner semi-finished product into a controlled atmosphere furnace to austenitize 100 minutes at 920° C., being quenched into the salt bath which has a composition of 50% sodium nitrite and 50% potassium nitrate, isothermal quenching 85 minutes at 330° C.; and low temperature tempering at 180° C. for 2 h.

Figure 4:
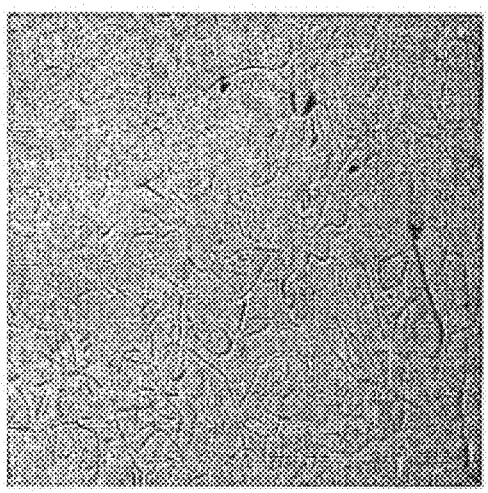
FIG. 4 is a view showing the structure of the cylinder liner manufactured by centrifugal casting after heat treatment of Example 2.
Figure 5:
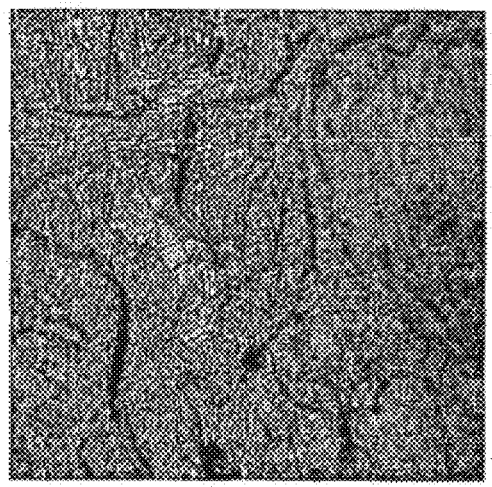
FIG. 5 is a photomicrograph (magnification: 500 times) of FIG. 4.
Figure 6:
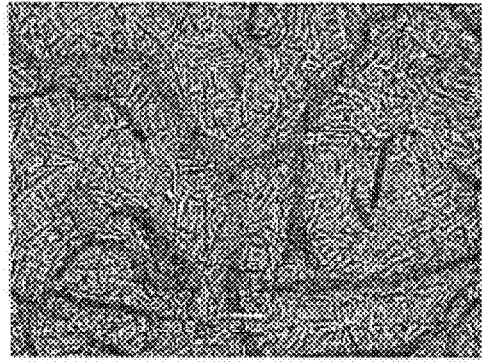
FIG. 6 is a SEM photograph (magnification: 1000 times) of FIG. 4.

As can be seen from FIGS. 4-6, the obtained structure of the cylinder liner is acicular ferrite and carbon-enriched austenite. Under the condition of a magnification of 100 times, the length of the graphite is 4-8 mm which meets the ATSMS class standard. The average hardness of the obtained cylinder liner is HRC42.8, Rm=448 Mpa.

Table 2 shows the dry friction test results of Example 2 cylinder liner, pearlite cylinder liner and cast bainite cylinder liner under different loads.

| load | volume wear rate of phosphorus-containing acicular ferrite cylinder liner ($\times 10^{-3} \cdot cm^3 \cdot cm^{-2}$) | volume wear rate of pearlite cylinder liner ($\times 10^{-3} \cdot cm^3 \cdot cm^{-2}$) | volume wear rate of cast bainite cylinder liner ($\times 10^{-3} \cdot cm^3 \cdot cm^{-2}$) |
|---|---|---|---|
| 100N | 9.89 | 11.71 | 10.30 |
| 200N | 11.30 | 43.11 | 14.15 |
| 300N | 12.21 | 134.25 | 28.13 |
| 400N | 12.69 | 181.31 | 60.05 |

Table 3 shows the compositions (% by mass) of the cylinder liner with high strength and wear resistance of Examples 3-7, and the methods are the same as Example 1.

|  | Example 3 | Example 4 | Example 5 | Example 6 | Example 7 |
|---|---|---|---|---|---|
| C | 3.15 | 3.00 | 3.25 | 3.2 | 3.25 |
| Si | 2.10 | 2.00 | 2.25 | 2.15 | 2.25 |
| P | 0.35 | 0.35 | 0.35 | 0.35 | 0.55 |
| S | 0.08 | 0.07 | 0.08 | 0.07 | 0.08 |

-continued

|  | Example 3 | Example 4 | Example 5 | Example 6 | Example 7 |
|---|---|---|---|---|---|
| Mn | 0.50 | 0.35 | 0.50 | 0.35 | 0.50 |
| Mo | 0.20 | 0.26 | 0.20 | 0.26 | 0.20 |
| Nb | 0.082 | 0.12 | 0.14 | 0.15 | 0.082 |
| Fe | the balance | the balance | the balance | the balance | the balance |

Table 4 shows the dry friction test results of Example 3 cylinder liner, pearlite cylinder liner and cast bainite cylinder liner under different loads.

| load | volume wear rate of phosphorus-containing acicular ferrite cylinder liner ($\times 10^{-3} \cdot cm^3 \cdot cm^{-2}$) | volume wear rate of pearlite cylinder liner ($\times 10^{-3} \cdot cm^3 \cdot cm^{-2}$) | volume wear rate of cast bainite cylinder liner ($\times 10^{-3} \cdot cm^3 \cdot cm^{-2}$) |
|---|---|---|---|
| 100N | 9.91 | 12.01 | 10.05 |
| 200N | 11.46 | 45.26 | 15.37 |
| 300N | 12.33 | 143.51 | 28.53 |
| 400N | 12.81 | 187.63 | 59.98 |

Table 5 shows the dry friction test results of Example 4 cylinder liner, pearlite cylinder liner and cast bainite cylinder liner under different loads.

| load | volume wear rate of phosphorus-containing acicular ferrite cylinder liner ($\times 10^{-3} \cdot cm^3 \cdot cm^{-2}$) | volume wear rate of pearlite cylinder liner ($\times 10^{-3} \cdot cm^3 \cdot cm^{-2}$) | volume wear rate of cast bainite cylinder liner ($\times 10^{-3} \cdot cm^3 \cdot cm^{-2}$) |
|---|---|---|---|
| 100N | 10.51 | 11.23 | 11.41 |
| 200N | 12.62 | 39.87 | 17.29 |
| 300N | 13.29 | 125.14 | 33.62 |
| 400N | 14.35 | 186.63 | 69.86 |

Table 6 shows the dry friction test results of Example 5 cylinder liner, pearlite cylinder liner and cast bainite cylinder liner under different loads.

| load | volume wear rate of phosphorus-containing acicular ferrite cylinder liner ($\times 10^{-3} \cdot cm^3 \cdot cm^{-2}$) | volume wear rate of pearlite cylinder liner ($\times 10^{-3} \cdot cm^3 \cdot cm^{-2}$) | volume wear rate of cast bainite cylinder liner ($\times 10^{-3} \cdot cm^3 \cdot cm^{-2}$) |
|---|---|---|---|
| 100N | 10.06 | 10.12 | 10.41 |
| 200N | 12.63 | 50.13 | 14.95 |
| 300N | 13.66 | 142.68 | 27.41 |
| 400N | 15.32 | 182.35 | 54.94 |

Table 7 shows the dry friction test results of Example 6 cylinder liner, pearlite cylinder liner and cast bainite cylinder liner under different loads.

| load | volume wear rate of phosphorus-containing acicular ferrite cylinder liner ($\times 10^{-3} \cdot cm^3 \cdot cm^{-2}$) | volume wear rate of pearlite cylinder liner ($\times 10^{-3} \cdot cm^3 \cdot cm^{-2}$) | volume wear rate of cast bainite cylinder liner ($\times 10^{-3} \cdot cm^3 \cdot cm^{-2}$) |
|---|---|---|---|
| 100N | 8.91 | 12.62 | 10.69 |
| 200N | 9.98 | 52.11 | 13.95 |
| 300N | 13.09 | 139.14 | 26.98 |
| 400N | 13.51 | 165.14 | 50.99 |

Table 8 shows the dry friction test results of Example 7 cylinder liner, pearlite cylinder liner and cast bainite cylinder liner under different loads.

| load | volume wear rate of phosphorus-containing acicular ferrite cylinder liner ($\times 10^{-3} \cdot cm^3 \cdot cm^{-2}$) | volume wear rate of pearlite cylinder liner ($\times 10^{-3} \cdot cm^3 \cdot cm^{-2}$) | volume wear rate of cast bainite cylinder liner ($\times 10^{-3} \cdot cm^3 \cdot cm^{-2}$) |
|---|---|---|---|
| 100N | 9.85 | 13.21 | 11.39 |
| 200N | 10.36 | 36.13 | 15.71 |
| 300N | 12.27 | 125.14 | 30.15 |
| 400N | 13.68 | 193.33 | 60.92 |

As can be seen from the Tables 1, 2, 4-8, the volume wear rates of the three materials cylinder liners are low under the load of 100N, and the volume wear rate of the phosphorus-containing acicular ferrite cylinder liner is the lowest. As the load increases, the volume wear rates of the inner walls of the three materials cylinder liners show upward trends, wherein the volume wear rate of the pearlite cylinder liner increases by a bigger margin, but the volume wear rate increasing with a lesser extent of the phosphorus-containing acicular ferrite cylinder liner layer is lower than the other two cylinder liners under the same load. Therefore, the wear resistance of phosphorus-containing acicular ferrite cylinder liner is significantly better than the other two cylinder liners, and this advantage is more significant with the increase of load.

Table 9 shows the mechanical properties of Examples 1-7 cylinder liners.

| mechanical properties | Example 1 | Example 2 | Example 3 | Example 4 | Example 5 | Example 6 | Example 7 |
|---|---|---|---|---|---|---|---|
| hardness (HBW) | 355 | 360 | 346 | 351 | 363 | 367 | 365 |
| tensile strength (MPa) | 463 | 460 | 441 | 451 | 473 | 480 | 462 |
| bending strength (MPa) | 740 | 736 | 705 | 721 | 756 | 776 | 739 |
| bending fatigue strength (MPa) | 178 | 185 | 171 | 182 | 183 | 190 | 179 |

Table 10 shows the comparison results of the mechanical properties of the three materials cylinder liners.

| mechanical properties | phosphorus-containing acicular ferrite cylinder liner | pearlite cylinder liner | cast bainite cylinder liner |
|---|---|---|---|
| hardness (HBW) | 350-370 | 250-280 | 330-350 |
| tensile strength (MPa) | 440-480 | 260-280 | 370-390 |
| bending strength (MPa) | 700-780 | 420-450 | 590-620 |
| bending fatigue strength (MPa) | 170-190 | 120-140 | 150-170 |

Therefore, the hardness, tensile strength, bending strength, bending fatigue strength and other mechanical properties of the phosphorus-containing acicular ferrite cylinder liner of this application are better than those of the other two cylinder liners.

The principle and mode of operation of this invention have been explained and illustrated in its preferred embodiments However, it must be understood that this invention may be practiced otherwise than as specifically explained and illustrated without departing from its spirit or scope.

What is claimed is:

1. A cylinder liner, wherein the composition (% by mass) of the cylinder liner is as follows: C: 3.0-3.3%, Si: 2.0-2.3%, P: 0.3-0.6%, S: <0.1%, Mn: 0.3-0.6%, Mo: 0.1-0.3%, Nb: 0.08-0.15%, and the balance Fe; wherein the structure of the cylinder liner is phosphorus-containing acicular ferrite and carbon-rich austenite, wherein phosphide eutectic is no less than 3%.

2. The cylinder liner according to claim 1, wherein the carbon content of the austenite is 1.8-2.2%.

3. The cylinder liner according to claim 2, wherein the composition (% by mass) of the cylinder liner is as follows: C: 3.25, Si: 2.25, P: 0.35, S: 0.08, Mn: 0.5, Mo: 0.2, Nb: 0.082, and the balance Fe.

4. The cylinder liner according to claim 2, wherein the composition (% by mass) of the cylinder liner is as follows: C: 3.2, Si: 2.15, P: 0.35, S: 0.07, Mn: 0.35, Mo: 0.26, Nb: 0.12, and the balance Fe.

5. The cylinder liner according to claim 2, wherein the composition (% by mass) of the cylinder liner is as follows: C: 3.15, Si: 2.10, P: 0.35, S: 0.08, Mn: 0.50, Mo: 0.20, Nb: 0.082, and the balance Fe.

6. The cylinder liner according to claim 2, wherein the composition (% by mass) of the cylinder liner is as follows: C: 3.00, Si: 2.00, P: 0.35, S: 0.07, Mn: 0.35, Mo: 0.26, Nb: 0.12, and the balance Fe.

7. The cylinder liner according to claim 2, wherein the composition (% by mass) of the cylinder liner is as follows: C: 3.25, Si: 2.25, P: 0.35, S: 0.08, Mn: 0.50, Mo: 0.20, Nb: 0.14, and the balance Fe.

8. The cylinder liner according to claim 2, wherein the composition (% by mass) of the cylinder liner is as follows: C: 3.20, Si: 2.15, P: 0.35, S: 0.07, Mn: 0.35, Mo: 0.26, Nb: 0.15, and the balance Fe.

9. The cylinder liner according to claim 2, wherein the composition (% by mass) of the cylinder liner is as follows: C: 3.25, Si: 2.25, P: 0.55, S: 0.08, Mn: 0.50, Mo: 0.20, Nb: 0.082, and the balance Fe.

10. A manufacturing method of the cylinder liner according to claim 1, wherein said method comprises:
   performing proportioning according to the weight percentage ratio of C: 3.0-3.3%, Si: 2.0-2.3%, Mn: 0.3-0.6%, Mo: 0.1-0.3%, Nb: 0.08-0.15% and the balance Fe,
   manufacturing said cylinder liner by centrifugal casting,
   austenitizing said cylinder liner in a neutral atmosphere,
   then performing isothermal quenching, and
   finally obtaining said cylinder liner by low temperature tempering.

11. The manufacturing method of the cylinder liner according to claim 10, wherein Q235 steel and pig iron are used in proportioning, whose mass ratio is 80:20.

12. The manufacturing method of the cylinder liner according to claim 11, wherein the composition adjustment is performed by adding carburant when the carbon content is insufficient.

13. The manufacturing method of the cylinder liner according to claim 12, wherein the composition (% by mass) of the carburant is as follows: C: ≥99.00%, volatile: ≤0.6%, ash: ≤0.4%, dry basis moisture: ≤0.2%, S: ≤0.40%.

14. The manufacturing method of the cylinder liner according to claim 10, wherein the isothermal quenching temperature is 330-350° C., and the isothermal quenching time is 75-85 minutes.

15. The manufacturing method of the cylinder liner according to claim 14, wherein the quenching liquid is a mixture of potassium nitrate and sodium nitrate with the mass ratio of 1:1.

16. The manufacturing method of the cylinder liner according to claim 14, wherein the low temperature tempering temperature is 160° C.-180° C., and the low temperature tempering time is 90-120 minutes.

17. The manufacturing method of the cylinder liner according to claim 14, wherein the condition of the austenitizing is that the holding time is 90-100 minutes and the temperature is 910° C.-930° C.

18. The manufacturing method of the cylinder liner according to claim 14, wherein the casting temperature is 1320° C.-1400° C. and the rotational speed of centrifugal machine is 1350-1400 RPM when centrifugal casting the cylinder liner.

19. The manufacturing method of the cylinder liner according to claim 18, wherein the pre-cooling time after centrifugal casting and before austenitizing is T(s)=12+3*s, wherein the "s" is the cylinder liner unilateral wall thickness (mm).

* * * * *